(12) United States Patent
Ylimartimo et al.

(10) Patent No.: US 9,385,870 B2
(45) Date of Patent: Jul. 5, 2016

(54) SECURE METHOD FOR REMOTE GRANT OF OPERATING RIGHTS

(71) Applicant: TOSIBOX OY, Oulu (FI)

(72) Inventors: Veikko Ylimartimo, Oulu (FI); Mikko Korkalo, Muhos (FI); Juho Juopperi, Oulu (FI)

(73) Assignee: TOSIBOX OY, Oulu (FI)

( * ) Notice: Subject to any disclaimer, the term of this patent is extended or adjusted under 35 U.S.C. 154(b) by 0 days.

(21) Appl. No.: 14/390,153

(22) PCT Filed: Apr. 3, 2013

(86) PCT No.: PCT/FI2013/050362
§ 371 (c)(1),
(2) Date: Oct. 2, 2014

(87) PCT Pub. No.: WO2013/150186
PCT Pub. Date: Oct. 10, 2013

(65) Prior Publication Data
US 2015/0341177 A1 Nov. 26, 2015

(30) Foreign Application Priority Data
Apr. 5, 2012 (FI) ..................................... 20120110

(51) Int. Cl.
*H04L 9/32* (2006.01)
*G06F 21/33* (2013.01)
(Continued)

(52) U.S. Cl.
CPC .............. *H04L 9/3268* (2013.01); *G06F 21/33* (2013.01); *G06F 21/44* (2013.01);
(Continued)

(58) Field of Classification Search
CPC ......... H04L 9/006; H04L 9/32; H04L 9/3215; H04L 9/3244; H04L 9/3247; H04L 9/3263; H04L 9/3268; H04L 63/0272; H04L 63/04; H04L 63/0442; H04L 63/08; H04L 63/0823; H04L 63/12; H04L 66/126; G06F 21/00; G06F 21/30; G06F 21/305; G06F 21/44; G07C 9/00; G07C 9/00007–9/00023; G07C 9/00174; G07C 9/00817; G07C 9/00857; G07C 2009/00277; G07C 2009/00523; G07C 2009/00825; G07C 2009/00865
See application file for complete search history.

(56) References Cited

U.S. PATENT DOCUMENTS 6,854,010 B1 * 2/2005 Christian ............... G06Q 10/10
709/219
7,391,298 B1 6/2008 Campbell et al.
(Continued)

FOREIGN PATENT DOCUMENTS

EP 2393266 A1 * 12/2011 ............. G08C 17/00
JP 2005-123996 A 5/2005
(Continued)

OTHER PUBLICATIONS

Japanese Office Application for JP 2015-503907 dated Mar. 30, 2015 and English translation.
(Continued)

*Primary Examiner* — Eric W Shepperd
(74) *Attorney, Agent, or Firm* — Volpe and Koenig, P.C.

(57) ABSTRACT

In the method and system of establishing a trusted relationship, first a virtual private network is established between a key device and at least one locking device. Thereafter, in order to establish a trusted relationship the key device sends a message encrypted with its private cryptographic key to at least one locking device. The message comprises the certificate of the trusted key device and the certificate of some other device, with which the locking device that received the message shall establish a new trusted relationship. By using the established trusted relationship either a trusted relationship between the locking device and a new key device or a trusted relationship between two or more locking devices is established, whereby a virtual private network can be established between the locking devices.

9 Claims, 4 Drawing Sheets

Figure 1:
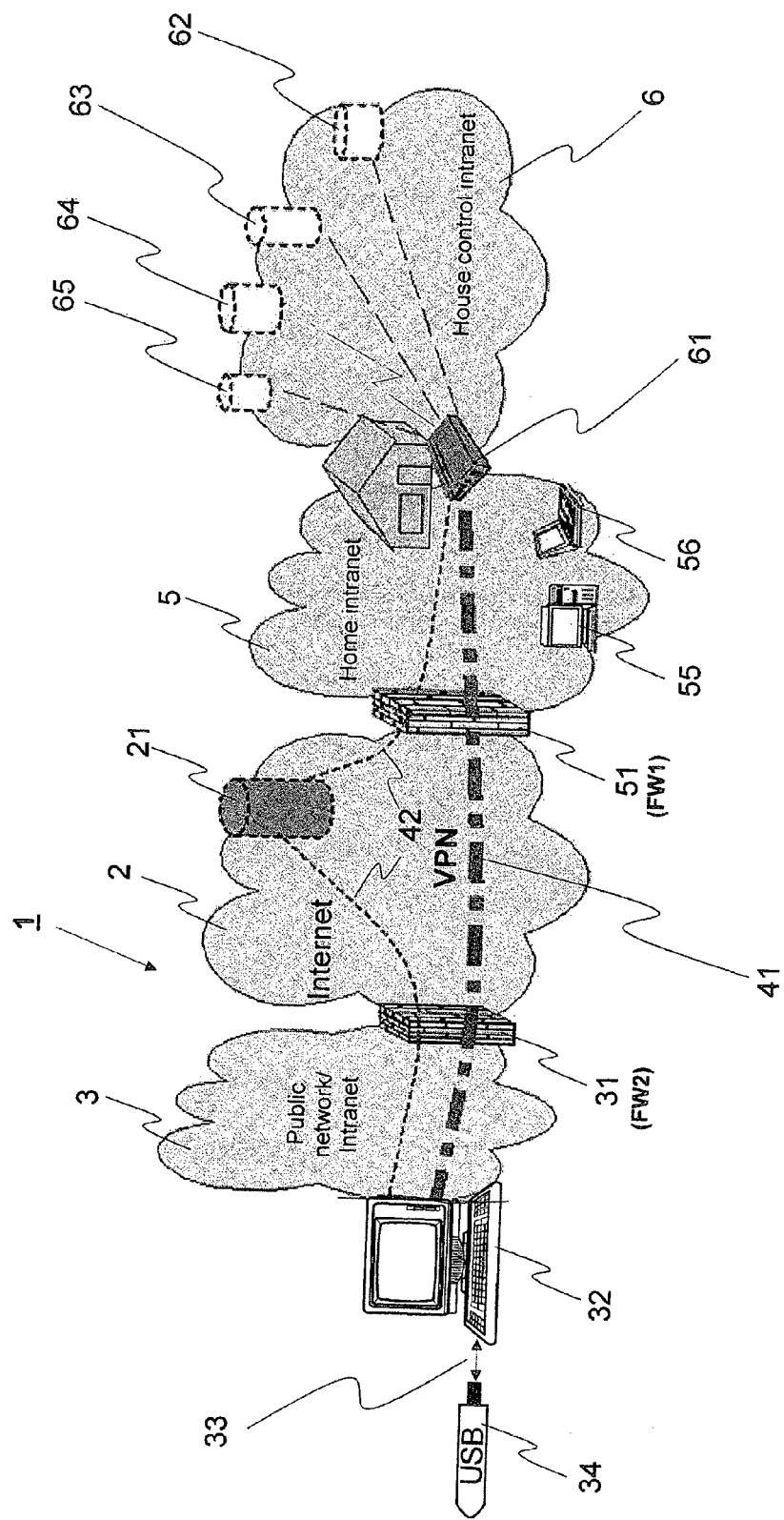

(51) Int. Cl.
*H04L 29/06* (2006.01)
*G06F 21/44* (2013.01)

(52) U.S. Cl.
CPC ....... *H04L 63/0272* (2013.01); *H04L 63/0442* (2013.01); *H04L 63/0823* (2013.01); *H04L 63/126* (2013.01); *H04L 63/0853* (2013.01)

(56) References Cited

U.S. PATENT DOCUMENTS

| | | | | |
|---|---|---|---|---|
| 8,120,460 | B1* | 2/2012 | Zhu | B60R 25/24 340/5.1 |
| 8,670,752 | B2* | 3/2014 | Fan | G07C 9/00309 380/247 |
| 8,947,200 | B2* | 2/2015 | Kuenzi | G07C 9/00103 340/5.51 |
| 2002/0017978 | A1* | 2/2002 | Kanda | G07C 9/00309 340/5.61 |
| 2003/0208386 | A1* | 11/2003 | Brondrup | G06Q 10/02 705/5 |
| 2005/0060555 | A1* | 3/2005 | Raghunath | G07C 9/00309 713/186 |
| 2005/0120204 | A1 | 6/2005 | Kiwimagi et al. | |
| 2008/0048826 | A1* | 2/2008 | Agrawal | G06F 19/327 340/5.61 |
| 2008/0103813 | A1* | 5/2008 | Agrawal | G07C 9/00111 705/2 |
| 2009/0030718 | A1* | 1/2009 | Bengson | G06Q 30/00 705/313 |
| 2010/0125894 | A1 | 5/2010 | Yasrebi et al. | |
| 2010/0161998 | A1* | 6/2010 | Chen | G06F 21/57 713/189 |
| 2011/0311052 | A1 | 12/2011 | Myers et al. | |
| 2012/0159184 | A1* | 6/2012 | Johnson | G06F 12/1466 713/189 |
| 2013/0305319 | A1* | 11/2013 | Matthews, III | G06F 3/0484 726/4 |

FOREIGN PATENT DOCUMENTS

| | | |
|---|---|---|
| JP | 2007-097010 a | 4/2007 |
| JP | 2008-287703 A | 11/2008 |
| JP | 2010086175 A | 4/2010 |
| JP | 20100134749 A | 6/2010 |
| WO | 0235479 A1 | 5/2002 |
| WO | 2009088901 A1 | 7/2009 |
| WO | 2011053357 A1 | 5/2011 |

OTHER PUBLICATIONS

Onno et al 'Conciliating remote home network access and MAC-address control', 2012 IEEE International Conference on Consumer Electronics (ICCE), Jan. 13, 2012, doi:10.1109/ICCE.2012.6161758, pp. 98-99.

"The Abbreviated Guide to Getting the Most out of Your Lockitron", Feb. 28, 2012. XP055222283. Retrieved from the Internet: URL: https:jjweb.archive.orgjweb/20151020112616/https://lockitron.comjpdf/lockitron_manual_deadbolt_16.pdf [retrieved on Oct. 20, 2015].

Pishva D et al: "Product-based security model for smart home appliances", IEEE Aerospace and Electronic Systems Magazine, IEEE Service Center, Piscataway, NJ, US. vol. 23, No. 10, Oct. 1, 2008. pp. 32-41. XP011237541, ISSN: 0885-8985. DOI: 10.1109/MAES.2008.4665323.

Stephane Onno et al: "Conciliating remote home network access and MAC-address control", Consumer Electronics (ICCE), 2012 IEEE International Conference on, IEEE, Jan. 13, 2012, pp. 98-99. XP032124785, DOI: 10.1109/ICCE.2012.6161758, ISBN: 978-1-4577-0230-3.

\* cited by examiner

SECURE METHOD FOR REMOTE GRANT OF OPERATING RIGHTS

The invention relates to a secure allocation procedure of operational rights to be utilized in a remote control method and remote control system of actuators in a property.

PRIOR ART

Remote-controllable devices and systems are increasingly being installed in properties and homes. The purpose of the systems is to secure and/or maintain such conditions in properties that living in them is both safe and pleasant.

On the market, a remote control arrangement for technical devices in a property and a remote control method utilizing this remote control arrangement are available, where the Internet connection, already existing in the properties and homes; is utilized as such in the remote use of the building service and surveillance. In said remote control arrangement a remote use device pair is utilized. The user carries a portable key device, and a locking device has been installed in the property, by means of which the destination connection of the property is altered to be suitable as such for remote use. Already existing functions of the data network connection in the destination and the intranet in the destination are not altered.

In said remote control arrangement, a locking device installed in a fixed manner in a property and a key device carried by a person realizing monitoring of the property are able to establish a secure two-way virtual private network (VPN) over the Internet based on contact information obtained from a remote control network server belonging to the remote control arrangement. The locking device in the property, to which locking device the devices to be remote-controlled or remote-monitored in the property are connected, are connected to a data network interface device/network terminal in the property, for example to a modem.

The remote control device pair of the arrangement forms a predetermined unique device pair or a device group, which identify each other in the network. Due to the identification method the key device carried along by the user or a computer program installed in some data processing device, which computer program implements the functions of the key device, establishes a network connection only with its own unique locking device, and a corresponding connection cannot be established with any other network device. Thus, the key device serves as a strong safety key to the "network doors" of the property.

The remote control network device pair used in the remote control arrangement can be established either in connection with manufacturing or in connection with start-up taking place later. In both cases the device pair is formed by connecting the locking device and the key device with each other for example at the USB port of the key device, whereby one or both of the devices receive each other's identification code, device certificate.

The current IP addresses of the locking device and the key device are maintained in the remote control network server belonging to the arrangement, which IP addresses are used for establishing a connection between said devices. Thanks to the utilized connection establishing methods both of said devices can be connected to some private, non-public network, and they can still establish among themselves a secure data transfer connection over the Internet. It is enough for establishing the data transfer connection over the Internet between the mobile key device and the fixed installed locking device that said devices at some point in the established connection also obtain a public IP address, even though simultaneously the locking device and the key device only have non-public IP addresses. The remote control network server does not participate in the establishing of the actual data transfer connection after it has sent the IP addresses of the devices to be available for the devices.

In said remote control arrangement, a physical interconnection of the locking device and the key device is required, if the devices need to be paired with each other. In the system, it is possible to add new key devices parallel or subordinate to the ones in use. This may be realized in the same way as the formation of the first pair of key device/locking device; by connecting the new key device to the USB port of the locking device. In practise, this may involve travelling of several hundreds of kilometers from the person who is performing the connecting of the new key to the remote control system.

The same key device may control several separate remote control objects via several separate locking devices. Changes of the mutual control relationship between these locking devices are not possible. A certain locking device can not be assigned as a master device for another locking device, which would serve as the slave locking device of the locking device serving as the master device.

OBJECT(S) OF THE INVENTION

An object of the invention is to provide a new allocation procedure of operational rights of either a new key device or locking device, utilized in the remote control arrangement of properties that can be realized through remote access to the locking device/devices.

The objects of the invention are achieved by a procedure where the certificate of the key device is transferred from the utilized data processing device through data transfer network to the locking device(s) signed with a valid private PKI key (Public Key Infrastructure) of the key device, whereafter both the PKI key and the certificate of the new key device received in the locking device(s) are identified, whereafter the addition or change of the operational right determined for the new, identified key device is realized in the locking device. If several separate locking devices are controlled with the same key device, the mutual relationship between locking devices can be altered in corresponding way by sending them the messages of alteration signed with a private PKI key.

An advantage of the method and arrangement according to the invention is that allocation of operational rights for a new key device can be performed without the need to connect the new key device physically to the target locking device.

Further, an advantage of the invention is that the mutual control relationships of several locking devices subordinated to the key device can be altered through remote access.

Further, an advantage of the invention is that by utilizing remote access by means of the key device a virtual private network can be established between two or more locking devices, whereby one locking device serves as an Internet connection device.

The method according to the invention is characterized in that
a trusted key device transmits a message encrypted with a private encryption key of a trusted key device to at least one locking device, the message comprising the certificate of the trusted key device and the certificate of at least one other device, with which the receiving locking device shall establish a trusted relationship, and definitions of measures done in establishing the trusted relationship a locking device opens and confirms with the known public encryption key of the trusted key device the authenticity of the sender of the message received by it the locking device saves certificates of devices related to the message sent by the identified device in its memory the locking device establishes a trusted relationship with at least one other device stated in the message.

The processor, memory and computer software code saved in it, according to the invention, are characterized in that the key device is configured to transmit from a trusted key device a message encrypted with a private encryption key of the trusted key device to at least one locking device, the message comprising a certificate of the trusted key device and a certificate of at least one other device, with which a receiving locking device shall establish a trusted relationship, and the definitions of measures done in establishing the trusted relationship to receive and save in its memory a confirmation message of establishing a trusted relationship from at least one locking device.

The computer programme according to the invention for providing key device functions of the remote control system of actuators in a property is characterized in that it comprises code means for transmitting from a key device a message encrypted with a private encryption key of the trusted key device to at least one locking device, the message comprising a certificate of the trusted key device and a certificate of at least one other key device or one other locking device, with which the receiving locking device shall establish a trusted relationship, and definitions of measures done in establishing the trusted relationship, and code means for receiving a confirmation message of establishing a trusted relationship of a locking device from at least one locking device and for saving the certificate of the locking device that sent the message in at least the memory of the trusted key device.

Some preferred embodiments of the invention are disclosed in the dependent claims.

The basic idea of the invention is the following: To realize remote control, in some properties a device pair, a locking device and a key device exist, in which device pair there is at least one locking device and at least one key device, that can form a data transfer connection based on virtual private network only with each other.

The locking device in the property to be remote-controlled is installed in an existing intranet network or Internet network in the property to be controlled. It establishes one subnetwork, a control intranet network, in the intranet or Internet network, to which control intranet network various actuators utilized in controlling or managing the property are connected either with a wired or wireless data transfer connection.

In one advantageous embodiment of the invention a single key device or several key devices can function as the device pair of two or more locking devices in different properties. The own identification code, the certificate and the private and the public PKI key of the locking device and the key device are saved in said devices during the manufacturing thereof. By using certificates the locking device and the key device are able to establish a two-way secure data transfer connection between them.

In connection with the start-up, both devices determine routing information of the devices from their location network all the way to a network terminal connected to the Internet, which routing information is needed for establishment of the connection. This routing information is stored in a remote control network server, connected to the Internet.

In the establishment procedure of a trusted relationship according to the invention, the key device can be connected to some data transfer device, which is able to establish a data transfer connection to the Internet. Possible data transfer devices are for example a PC, a tablet computer or a smart phone.

In one advantageous embodiment of the invention, the computer program implementing the functions of the key device is saved on a portable data storage means, for example a USB stick, from which the computer program to be utilized in remote control can, when required, be installed into a suitable data processing device. Thereby, the computer program installed in the data processing device performs the necessary functions of the key device.

In an advantageous embodiment the USB key device is connected to a data transfer device connected to the local network. Thereby, the USB key device first determines its own routing through different subnetworks to the remote control network server. When the routing is determined, the current routing information of the USB key device is saved in the remote control network server according to the invention.

When a new key device needs to be connected to an existing remote control arrangement, both the already operating USB key device and a new USB key device to be introduced are connected to the used data transfer device. In this situation, the locking devices controlled by the operating USB key device are shown on the screen of the used data processing device. From this list the user selects the locking devices as a key of which the new USB key device to be connected to the system is to serve. After the selection, a request message for establishing a trusted relationship, confirmed with the certificate of the already operating USB key device is sent to the selected locking devices, encrypted with a private PKI key of a trusted USB key device. Each locking device opens the received message with a public PKI key of a trusted USB key device. Thereafter, each locking device checks that the received certificate corresponds to the certificate of the USB key device paired with it and which certificate is thus known. If the identification is successful, the certificate of the new USB key device that was delivered with the certificate of the trusted USB key device and its public PKI key are saved in the respective locking device. A message about success of identification and establishment of a trusted relationship is sent to the USB key device that sent the message, which key device saves, based on the received message, the certificate of the known locking device in the memory of the new USB key device. Thereafter, the respective locking device can be controlled with both USB key devices. When the requested new operational rights (trusted relationships with locking devices) have been successfully established for the new USB key device, it can be separated from the data processing device and sent for example by mail to a person who has the right to use said new key device.

Figure 2:
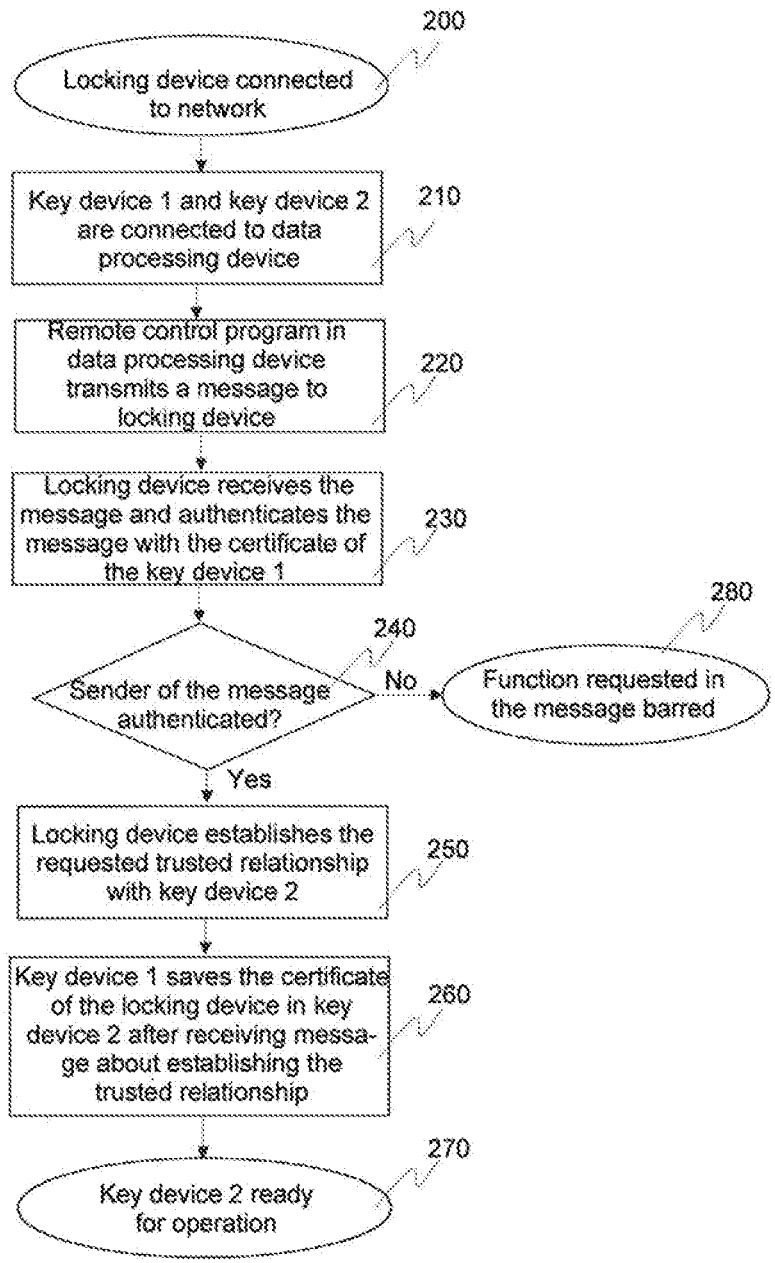
Figure 3:
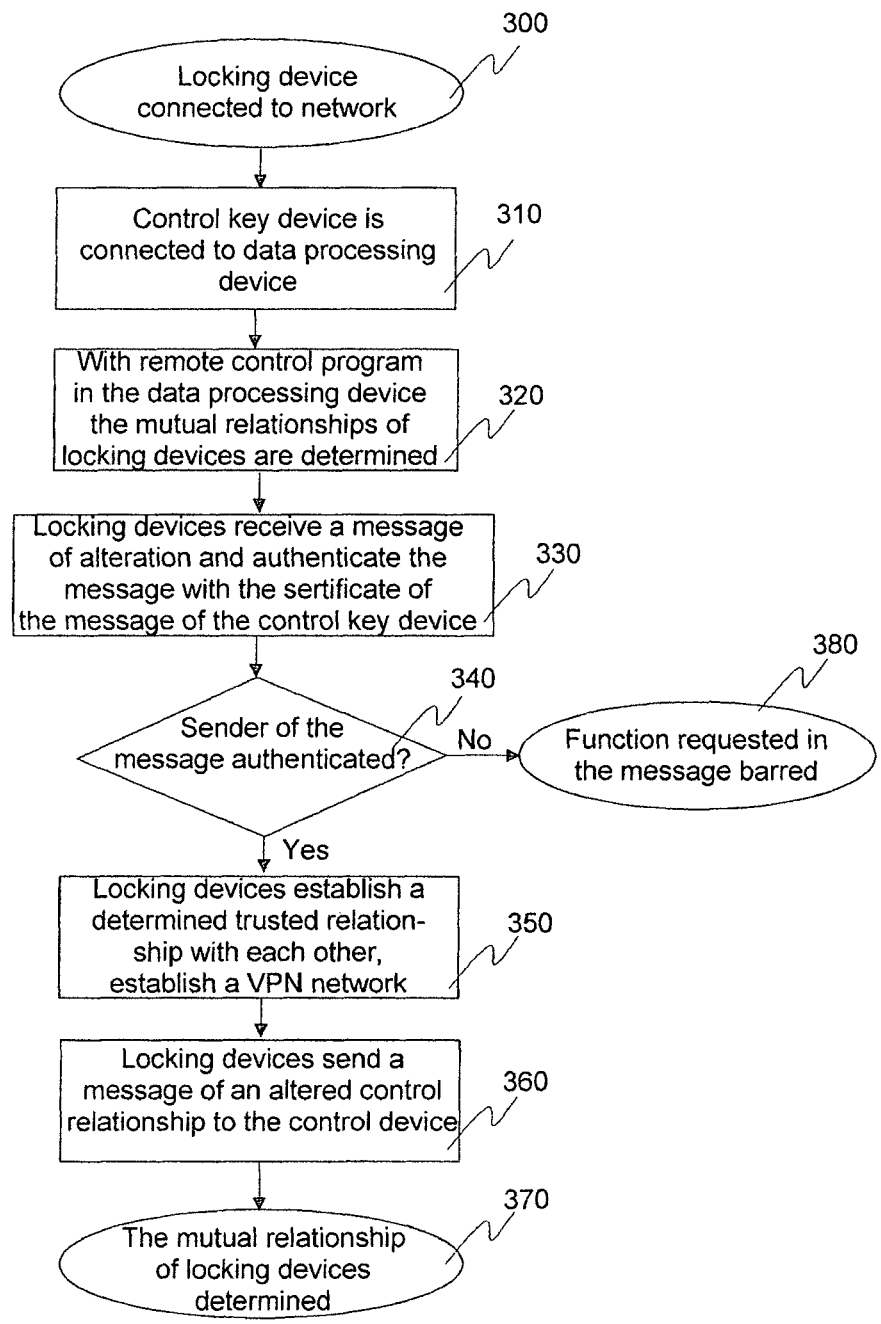
Figure 4:
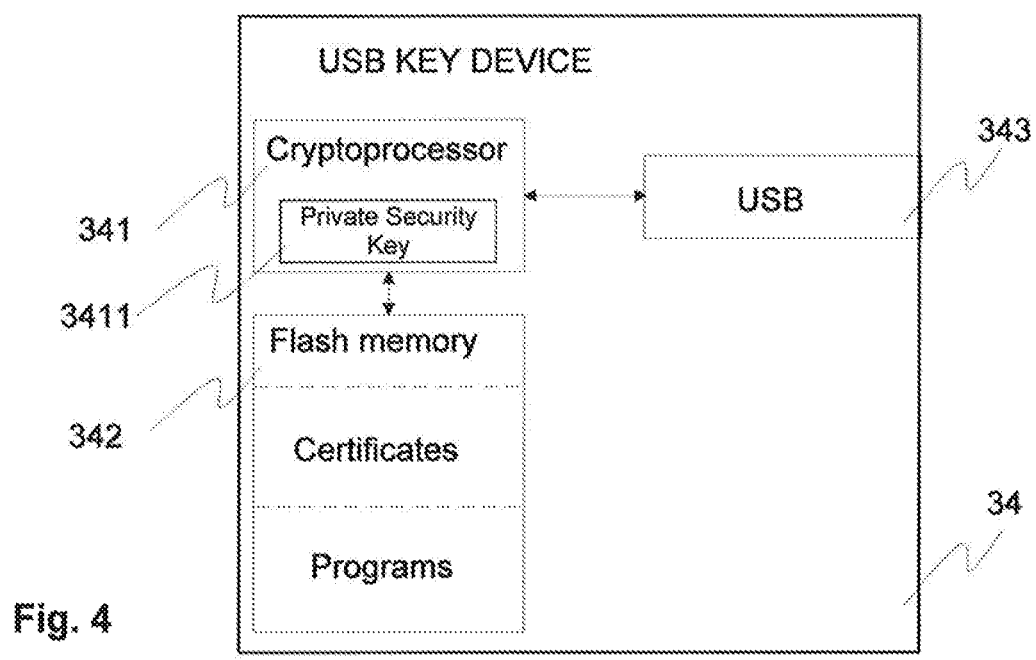

In the following, the invention will be described in detail. In the description, reference is made to the enclosed drawings, in which FIG. 1 shows an example of a remote control arrangement, wherein a two-way data transfer connection can be established between a client device handling remote control and an individual control or management device of a property, FIG. 2 shows as an exemplary flow chart, how operational rights are allocated for a new key device FIG. 3 shows as an exemplary flow chart, how a virtual private network is established between two locking devices, and FIG. 4 shows by way of example a USB key device according to the invention, The embodiments in the following description are given as examples only, and a person skilled in the art may realize the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

FIG. 1 shows an advantageous embodiment 1 of the remote control system. In the example of FIG. 1, with one USB key device 34 a data transfer connection is established, utilizing a data processing device 32, to one locking device 61 located in a property elsewhere. The USB key device 32 can, however, advantageously operate also with separate locking devices (not shown in FIG. 1) located in two or more properties.

In FIG. 1, the Internet is referred to with reference 2. Some public network or an intranet, reference 3, is also connected to the Internet 2. The network 3 may be a fixed or a wireless data transfer network. In FIG. 1, a client device 32 implementing remote control joins the network 3. For realizing the remote control connection the USB key device 34 is connected to the USB port 33 of the client device.

The house intranet in the property to be remote-controlled is designated with reference 5 in FIG. 1. Exemplary data processing devices, references 55 and 56, are connected to the house intranet network 5. Further, another data transfer network 6, a house control intranet, is connected to the house intranet network 5. Actuators 62-65 to be remote-controlled in the property are connected to the home control intranet 6 either with a wireless data transfer connection or a cable connection.

The USB key device 34 and the locking device 61 need each other's routing information through the Internet 2, in order to be able to establish between them an end-to-end data transfer connection based on the data link layer or network layer, in the example of FIG. 1, a VPN data transfer connection 41. The determined real time routing information is saved by both the USB key device 34 and the locking device 61 in a remote control network server 21 on the Internet via connection 42.

In order for it to be possible to establish the data transfer connection, the USB key device 34 and the locking device 61 must determine their actual network path from their own network at least up to the Internet 2. This network path determination can be made in several known ways, which the USB key device 34 and the locking device 61 advantageously are able to utilize.

In the example of FIG. 1, the NAT firewalls 31 (FW2) and 51 (FW1), which separate the local networks from the Internet, are advantageously not limiting the outgoing UDP traffic (User Datagram Protocol). Thereby, in the example of FIG. 1, in the data link layer an Ethernet level connection can be established between the remote control key device 34 and the locking device 61, when they know each other's IP addresses.

Also in those cases, where firewalls 31 and/or 51 limit the outgoing traffic at least in some connection procedures, the firewalls can be passed by using suitable other traffic protocols and by means thereof a data transfer connection can be established between the USB key device 34 and the locking device 61.

When in the remote control system 1 according to FIG. 1 it is desired to establish a virtual private network (VPN) 41 between the data processing device 32 connected to the USB key device 34 and the locking device 61, then in the first step, both devices 34 and 61 retrieve from the remote control network server 21 the routing information saved therein by the counterpart device via the data transfer connection 42. Before handing over the routing information, the remote control network server 21 checks that it is really a question of an allowed USB key device-locking device pair. Thereafter, by means of the retrieved routing information the USB key device 34 and the locking device 61 establish a direct VPN connection 41 between them. When the VPN connection 41 is completed, a data processing device 32 in the data transfer network 3 can make a connection with one or more devices 62, 63, 64 or 65 in the house control network 6.

FIG. 2 shows as an exemplary flow chart, how an existing USB key device is utilized in establishing the operational rights, so called trusted relationship, of a parallel new USB key device. Below, these key devices are referred to as USB key device 1 and USB key device 2. The USB key device 1 may also be referred to with the reference number 34 of FIG. 1. In the establishing method of a trusted relationship, messages encrypted with a private PKI key are utilized (public cryptographic key method). The devices send to each other messages encrypted with an own private PKI key, which messages can be opened by the receiving device with the known public PKI key of the sending device. The sender of the message is confirmed with the sender's certificate related to the received message, which certificate is known by the receiving device. The certificate, the private cryptographic key and the public cryptographic key together form the information necessary in the use of the PKI method.

Step 200 describes a situation where the remote control arrangement is in working order and in use. Thereby, at least one locking, device 61 is connected to the remote control system 1. In this state, the locking device 6 is constantly prepared to receive messages either from its USB key device 34 (USB key device 1) or from the remote control network server 21, shown in FIG. 1.

In step 210, establishing of a trusted relationship of a new USB key device 2 with locking device 61 parallel to an existing key device 1 (reference 34 in FIG. 1) is started. Both USB key devices 1 and 2 are of that kind that they can be connected to the USB ports of the data transfer device 32 in use. The establishment procedure of a trusted relationship is started, when at the same time, both the USB key device 1 and the USB key device 2 are connected to two USB ports of a data processing device 32, for which key devices operational rights to at least one locking device are required. Thereafter, the software utilized in the remote control is activated with the data processing device 32. The software may be pre-installed in the data processing device 32, or the data processing device starts execution of said program in the USB key device 34 (USB key device 1).

In this step, all locking devices, with which the USB key device 1 has been paired (that is, there is a trusted relationship between them), are displayed on the screen of the data processing device 32. From this list a locking device or locking devices are selected, with which the new USB key device 2 needs to be paired. An individual message is formed about the selection for each locking device involved in the pairing, the message comprising a certificate and a public PKI key of the new USB key device 2. The message to be sent is signed with a private PKI key of the USB key device 1. The message can be formed for example as follows:

To: Lock 61
From: Key 1
Message: Allow connection from Key 2
Pairing permission: No
Set mode: Lock Certificate: <Key 2 Certificate>
Signature: <Key 1 Signature>

In step 220, the remote control software operating in the data processing device 32 sends a message to the locking device 61 formed in step 210, the signature of which is encrypted with a private cryptographic key of the USB key device 1.

In step 230, the locking device 61 first receives the message from the USB key device 1. Next, with a known public PKI key of the USB key device 1 it opens the message and the signature of the related key device 1. Thereafter, the locking device 61 reads also the certificate of the other USB key device 2 included in the message.

In step 240, the locking device 61 compares the certificate related to the received signature of the USB key device 1 with the certificate of the USB key device 1 saved in its own memory. If there is no match in the comparison, the process ends at step 280.

If the result of comparison in step 240 shows that the message was sent by the USB key device 1, the process continues to step 250.

In step 250 the locking device 61 establishes the requested trusted relationship with the new USB key device 2 and therefore saves the certificate of the USB key device Z in its memory. Thereafter, the locking device 61 sends a confirmation of the formed trusted relationship to the USB key device 1.

In step 260, the USB key device 1 first receives the message about establishing the trusted relationship, sent by the locking device 61, and after that saves the certificate of the known locking device 61 in the memory of the USB key device 2. After this the USB key device 2 can serve as the key device of the locking device 61, step 270.

FIG. 3 shows as an exemplary flow chart, how an existing USB key device is utilized when establishing a trusted relationship between two separate locking devices, which locking devices have an existing trusted relationship with the same USB key device. Below, the key devices are referred to as USB key device and the locking devices as locking device 1 and locking device 2. The USB key device may also be referred to with the reference number 34 of FIG. 1. The establishment method of a trusted relationship is based on use of private and public PKI keys (public cryptographic key method). Both the key device and the locking devices 1 and 2 send to each other messages signed with their private PKI key, the receiving device being able to open with the respective known public PKI key of the sending device. The receiving device verifies with the certificate of the sending device related to the message that the message was truly sent by the signed trusted device.

Step 300 describes a situation where the remote control arrangement is in working order and in use. Thereby, at least locking devices 1 and 2 are connected to the remote control system 1. In this state, the locking devices 1 and 2 are constantly prepared to receive messages either from their USB key device 34 (USB key device) or from the remote control network server 21, shown in FIG. 1.

In step 310 the establishment of a trusted relationship is started between locking devices 1 and 2. The establishment procedure of a trusted relationship is started, when the USB key device is connected to the USB port of the data processing device 32, by using of which key device it is desired to establish a trusted relationship between locking devices 1 and 2. Thereafter, the software utilized in the remote control of the locking devices is activated with the data processing device 32. The software may be pre-installed in the data processing device 32, or the data processing device starts execution of said program in the USB key device.

In this step, all locking devices, with which the respective USB key device has been paired (that is, there is a trusted relationship between them), are displayed on the screen of the data processing device 32. From this list, in the example of FIG. 3, the locking device 1 and locking device 2 are selected, between which it is required to establish a trusted relationship. At the same time, the character of the trusted relationship is determined, that is, the way in which the locking devices will later establish networks with each other. In the example of FIG. 3, the aim of establishing a trusted relationship is to establish a VPN data transfer connection between locking devices 1 and 2. After selecting the locking devices an individual message for both locking devices is created, which comprises the character of the trusted relationship to be established. The messages to be sent are signed with a private PKI key of the USB key device, and the certificate of the sending USB key device is included in the message.

In step 320, with the remote control software, operating in the data processing device 32, the messages to the locking devices 1 and 2, necessary in the establishing of a trusted relationship, are created.

The message for the locking device 1 serving later as a server can preferably be formed as follows:
To: Lock 1
From: Key
Command: Allow connection from Lock 2
Pairing permission: No
Set mode: Lock
Certificate: <Lock 2 Certificate>
Signature: <Key Signature>

The message for the locking device 2 serving as a client device (slave device) of the locking device 1 serving later as a server can preferably be formed as follows:
To: Lock 2
From: Key
Command: Allow connection from Lock 1
Pairing permission: No
Set mode: Sublock
Certificate: <Lock 1 Certificate>
Signature: <Key Signature>

In the end of step 320 the remote control software operating in the data processing device 32 sends to the locking devices 1 and 2 messages formed about establishing a trusted relationship, which messages are encrypted With a private PKI key of the USB key device. In transmitting messages advantageously so called Matchmaking service is used.

In step 330, the locking devices 1 and 2 first receive the message about establishing a trusted relationship sent by the USB key device to the respective locking device. Next, it opens the message with a known public PKI key of the USB key device. The locking devices check that the signature of the sending USB key device corresponds to the signature of the USB key device in their memory. After this the locking devices read also the certificate of the other locking device included in the message.

In step 340, the locking devices 1 and 2 compare the received certificate of the USB key device, related to the signature of the USB key device with the certificate of the USB key device saved in its own memory. If there is no match in the comparison, the process ends at step 380.

If the result of comparison in step 340 shows that the message was sent by the USB key device, the process continues to step 350 in both locking devices 1 and 2.

In step 350, the locking devices 1 and 2 establish the required trusted relationship between themselves and therefore save each other's certificates in their own memories. Thereafter, the locking devices send a confirmation of the formed trusted relationship also to the USB key device.

In step 360, the locking device 1 and locking device 2 form by means of known certificates of the counterpart a VPN network between themselves, where the locking device 1 serves as the server device (master device). The establishment process of a VPN private network between two locking devices is similar to what is disclosed in connection with FIG. 1, where the VPN private network is established between one USB key device and one locking device.

Thereafter, all messages from the USB key device travel to the locking device 2 always via the locking device 1, step 370.

All the process steps shown in FIGS. 2 and 3 can be realized with computer program commands, which are executed in a suitable general-purpose or special-purpose processor. The computer commands can be stored in a computer-readable medium, such as a data disc or a memory, from where the processor can retrieve said computer program commands and run them. The references to a computer-readable medium can for example also contain special components, such as programmable USB Flash memories, logic arrays (FPLA), application-specific integrated circuits (ASIC) and signal processors (DSP).

FIG. 4 shows functional main parts of the USB key device 34. The USB key device 34 can comprise one or several cryptoprocessors 341. Processor or processor means can comprise an arithmetic logic unit, a group of different registers and control circuits. The cryptoprocessor 341 advantageously comprises an internal memory unit, in which an individual private cryptographic key 3411 is stored.

A data storing arrangement 342, such as a Flash memory unit or memory means, wherein computer-readable information or programs or user information can be stored, is connected to the processor means. The memory means 342 typically contain memory units, which allow both reading and writing functions (Random Access Memory, RAM), and memory units containing non-volatile memory, from which data can only be read (Read Only Memory, ROM). The certificate of the USB key device 34, the private and public PKI keys, the current network path information of the USB key device, the identification information of the locking devices serving as its device pairs, certificates, the public PKI keys of the device pairs and all the programs necessary for the operation of the USB key device 34 to be utilized in the establishment of the VPN connection are advantageously stored in the memory means 342.

Some examples of programs stored in the memory of the remote control key device 34 are an operating system (e.g. Linux), TCP/IP programs, a VPN program (e.g. OpenVPN), a DHCP client device/server program (e.g. ISC DHCP), a data-base program (e.g. SQLite), a certificate management/confirmation program (e.g. GPG) and a user interface library (e.g. LuCI).

The USB key device 34 also comprises interface elements, which comprise an input/output or input/output means 343 for receiving or sending information. The information received with the input means is transferred to be processed by the processor means 341 of the remote control key device 34. The interface elements 343 of the USB key device 34 are advantageously used to transfer information from the memory 342 of the USB key device 34 either to an external data processing device 32 or to the locking device 61 (in example of FIG. 1). Correspondingly, information or commands can be received via the interface elements for example from the data processing device 32, to which the USB key device 34 is connected.

Regarding levels of operational rights there are at least two levels of the above-described USB key devices 34, for example administrator and basic user level key devices. A user/owner (e.g. an administrator) of a higher operational right level has control right over all control targets of users (such as basic users) of remote control key devices on a lower level (such as basic users). An owner of a lower level key device operational right level does on the other hand not have access to any other control target of higher operational right level than his own targets.

Above some advantageous embodiments of the method and the device according to the invention are described. The invention is not limited to the solutions described above, but the inventive idea can be applied in numerous ways within the scope of the claims.

The invention claimed is:

1. A method for establishing new trusted relationships between key devices and locking devices utilized in a virtual private network in a remote control system of actuators of a property method comprising:
    a key device trusted by at least one locking device is electrically connected to a data processing device, which is in connection with the Internet;
    the trusted key device determines a network path of the trusted key device to the Internet and saves the network path in a server connected to the Internet;
    the trusted key device receives network path information of at least one locking device;
    the trusted key device forms a virtual private network with at least one locking device;
    the trusted key device transmits a message encrypted with a private encryption key of the trusted key device to at least one locking device, the message comprising a certificate of the trusted key device and a certificate of at least one other device with which the at least one receiving locking device shall establish a trusted relationship, and the definitions of measures done in establishing the trusted relationship;
    the locking device opens and confirms with a known public encryption key of the trusted key device (34) the authenticity of a sender of the message received by the locking device;
    the locking device saves certificates of the trusted key device and the at least one other device related to the message sent by the trusted key device in the memory of the locking device; and
    the locking device establishes a trusted relationship with the at least one other device stated in the message.

2. The method of establishing a trusted relationship according to claim 1, wherein another key device is electrically connected to the data processing device, the certificate of the another key device is included by the trusted key device in a message sent to at least one locking device.

3. The method of establishing a trusted relationship according to claim 2, wherein the trusted key device receives a confirmation message of establishing a trusted relationship from the at least one locking device, and the trusted key device saves in a memory of the another key device a certificate of the at least one locking device from which the message confirming the establishment of the trusted relationship was received.

4. The method of establishing a trusted relationship according to claim 1, wherein the key device sends to at least two locking devices a separate individual message that comprises a certificate of at least one other locking device and a description of a functional relationship between locking devices mentioned in the message.

5. The method of establishing a trusted relationship according to claim 1, wherein at least two locking devices establish a virtual private network between each other by utilizing certificates received from the key device, in which private network one locking device serves as a server device and at least one other locking device serves as a client device of the server.

6. A key device of actuators of a remote control system of a property, comprising:
   network connection interface elements, which comprise input/output means for connecting the key device to a data processing device connected to the Internet;
   a processor; and
   a memory, which contains computer program code, wherein the processor, the memory and the computer program code saved therein are configured to:
   transmit from the key device trusted by at least one locking device a message encrypted with a private encryption key of the trusted key device to at least one locking device, the message comprising a certificate of the trusted key device and a certificate of at least one other device with which the receiving at least one locking device shall establish a trusted relationship, and definitions of measures done in establishing the trusted relationship; and
   receive and save in the memory a confirmation message of establishing the trusted relationship from the at least one locking device.

7. The key device of actuators of a property according to claim 6, wherein the processor, the memory and the computer program code saved in the memory are configured to include in the message sent to the at least one locking device a certificate of another key device electrically connected to a data processing device.

8. The key device of actuators of a property according to claim 7, wherein the processor, the memory and the computer program code saved in the memory are configured to receive from the at least one locking device a confirmation message of establishing the trusted relationship, and that the trusted key device is configured to save in the memory of another key device at least one certificate of the at least one locking device from which the message confirming the establishment of the trusted relationship was received.

9. A computer program comprising computer program code means saved in a non-transitory computer-readable medium for providing key device functions of a remote control system of actuators or for establishing a trusted relationship between at least two locking devices, the computer program code means comprising:
   code means for determining a network path from a key device used in establishing a trusted relationship to the Internet and for saving the network path in a remote control server connected to the Internet;
   code means for receiving network path information of at least one locking device from the remote control server;
   code means for forming a virtual private network with the at least one locking device by means of the network path information and a certificate of the at least one locking device;
   code means for transmitting from the key device a message encrypted with a private encryption key of the key device trusted by at least one locking device to at least one locking device, the message comprising a certificate of the trusted key device and a certificate of at least one other key device or other locking device, with which the receiving locking device shall establish a trusted relationship, and definitions of measures done in establishing the trusted relationship; and
   code means for receiving a confirmation message of establishing the trusted relationship of the locking device from the at least one locking device and for saving the certificate of the at least one locking device that sent the message in at least a memory of the trusted key device.

* * * * *